United States Patent
Doidge et al.

(10) Patent No.: US 10,983,746 B2
(45) Date of Patent: Apr. 20, 2021

(54) GENERATING DISPLAY DATA

(71) Applicant: DisplayLink (UK) Limited, Cambridge (GB)

(72) Inventors: Ian Christopher Doidge, Cambridge (GB); Patrick David Cooper, Cambridge (GB)

(73) Assignee: DISPLAYLINK (UK) LIMITED, Cambridge-Cambridgeshire (GB)

( * ) Notice: Subject to any disclaimer, the term of this patent is extended or adjusted under 35 U.S.C. 154(b) by 0 days.

(21) Appl. No.: 16/515,140

(22) Filed: Jul. 18, 2019

(65) Prior Publication Data

US 2020/0034103 A1    Jan. 30, 2020

(30) Foreign Application Priority Data

Jul. 24, 2018   (GB) ..................................... 1812044

(51) Int. Cl.
*G06F 3/14*   (2006.01)
*H04N 13/167*   (2018.01)
*H04N 13/139*   (2018.01)
*G06F 3/03*   (2006.01)
(Continued)

(52) U.S. Cl.
CPC .......... *G06F 3/1446* (2013.01); *G06F 3/0304* (2013.01); *G06F 3/048* (2013.01); *G06F 15/177* (2013.01); *H04N 13/139* (2018.05); *H04N 13/167* (2018.05)

(58) Field of Classification Search
CPC ...... G06F 3/1446; G06F 3/0304; G06F 3/048; G06F 15/177; G06F 3/011; G06F 3/012; G06F 3/14; H04N 13/167; H04N 13/139; G02B 27/017; G02B 27/0172; G02B 2027/014; G02B 2027/0187;
(Continued)

(56) References Cited

U.S. PATENT DOCUMENTS

| | | | |
|---|---|---|---|
| 10,360,876 B1* | 7/2019 | Rahman | G06F 3/1423 |
| 2015/0379772 A1* | 12/2015 | Hoffman | G06T 19/006 |
| | | | 345/633 |
| 2017/0227773 A1* | 8/2017 | Aksit | G02B 27/0172 |

(Continued)

FOREIGN PATENT DOCUMENTS

| | | |
|---|---|---|
| CN | 106454312 A | 2/2017 |
| CN | 106598253 A | 4/2017 |
| CN | 107801014 A | 3/2018 |

*Primary Examiner* — Koosha Sharifi-Tafreshi
(74) *Attorney, Agent, or Firm* — Haynes and Boone, LLP

(57) ABSTRACT

A method of generating display data at a display control device for display on a movable display involves receiving and storing a current frame of display data from a host device. The current frame is then processed and output for display on the movable display. Sensor data from sensors associated with the movable display is received and stored, the sensor data indicating movement and/or position of the movable display. If it is determined that a next frame of display data is not ready at the display control device for processing and outputting to the movable display at a required time, then an estimated next frame of display data is generated using the stored current frame and the stored sensor data and the estimated frame of display data is output for display on the movable display. The sensor data may be received either before or after the current frame is received, stored, processed or output.

20 Claims, 8 Drawing Sheets

(51) Int. Cl.
*G06F 3/048* (2013.01)
*G06F 15/177* (2006.01)

(58) Field of Classification Search
CPC .......... G06T 19/006; G09G 2320/0252; G09G 2350/00; G09G 2354/00; G09G 2370/00; G09G 2370/022
See application file for complete search history.

(56) References Cited

U.S. PATENT DOCUMENTS

| | | | |
|---|---|---|---|
| 2018/0146189 A1* | 5/2018 | Park | G02B 27/017 |
| 2018/0255290 A1* | 9/2018 | Holzer | H04N 13/221 |
| 2018/0286004 A1* | 10/2018 | Babu | G06F 3/012 |
| 2018/0286105 A1* | 10/2018 | Surti | H04N 13/344 |
| 2019/0138834 A1* | 5/2019 | Collet Romea | G06K 9/00221 |
| 2020/0034103 A1* | 1/2020 | Doidge | G06F 3/1446 |

* cited by examiner

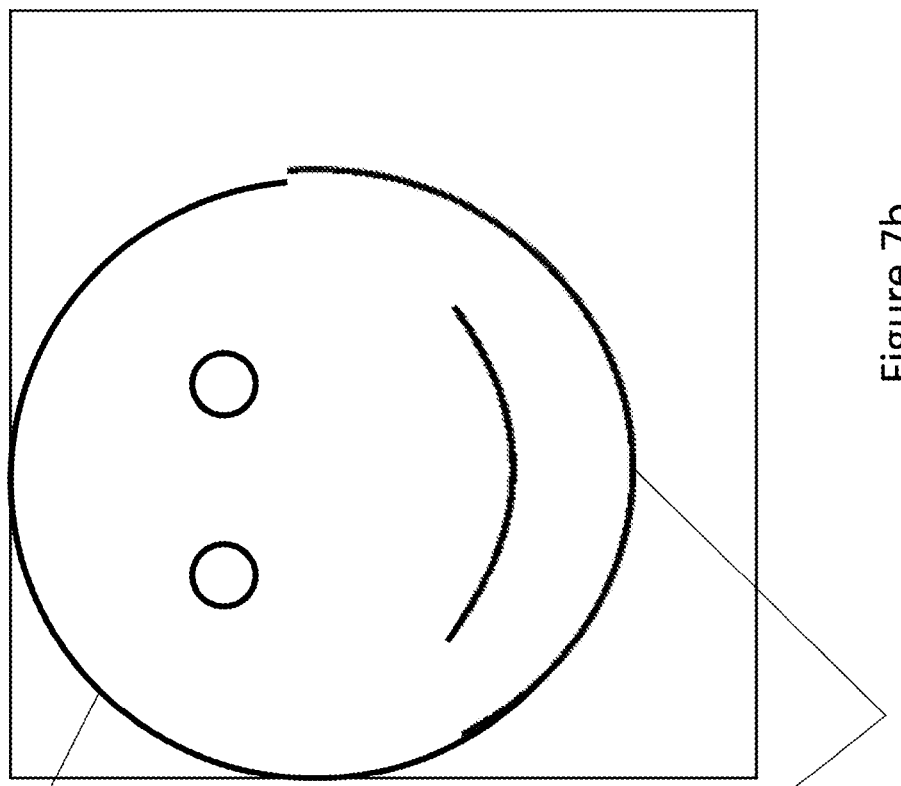
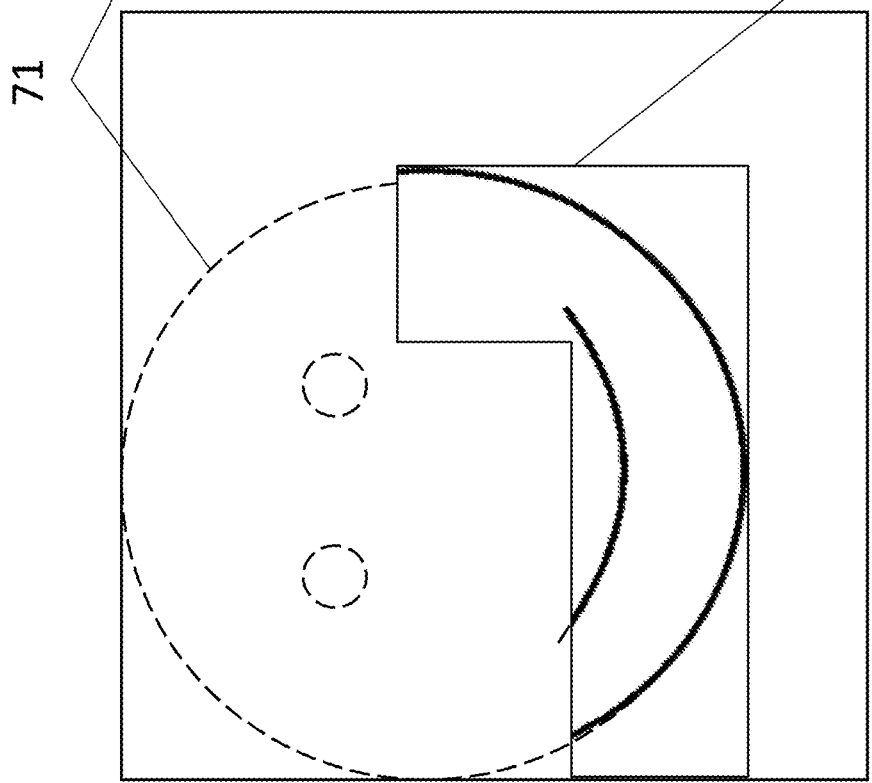
Figure 7b
Figure 7a

GENERATING DISPLAY DATA

CROSS-REFERENCE TO RELATED APPLICATIONS

This application claims priority to UK patent application GB 1812044.4, filed Jul. 24, 2018, the contents of which are incorporated herein by reference.

BACKGROUND

When a mobile display device, such as a virtual-reality or augmented-reality headset moves, the display data displayed on it needs to change in a manner that matches the movement in order to give the impression that the viewer is looking at a different part of a virtual world. This change must be extremely prompt in order to avoid problems for the user such as disorientation and motion sickness.

As a result, every time the display device moves, it requires an updated frame from a connected host device. This can result in problems, especially where the bandwidth of the connection between the display device and the host device is limited. Specifically, the updated frame may not have been received in its entirety by the time it is required for display. This can result in visual artefacts such as tearing.

The present invention therefore seeks to mitigate this problem.

SUMMARY

Accordingly, in a first aspect, the invention provides a method of generating display data at a display control device for display on a movable display, the method comprising:
  receiving and storing a current frame of display data from a host device;
  processing the current frame of display data;
  outputting the current frame of display data for display on the movable display;
  receiving and storing sensor data from sensors associated with the movable display indicating movement and/or position of the movable display;
  transmitting information relating to the sensor data to the host device;
  determining that a next frame of display data is not ready at the display control device for processing and outputting to the movable display at a required time;
  generating an estimated next frame of display data using the stored current frame and the stored sensor data; and
  outputting the estimated frame of display data for display on the movable display;
wherein receiving the sensor data occurs before or after the receiving and storing a current frame, the processing the current frame or the outputting the current frame.

Preferably, determining that a next frame of display data is not ready at the display control device comprises determining that at least a portion of the next frame of display data has not been received and stored in time for processing and outputting to the movable display.

In one embodiment, if it is determined that a first portion of the next frame of display data has been received in time, but that a second portion of the next frame of display data has not been received in time, generating an estimated second portion of the next frame of display data using the stored current frame and the sensor data, and generating the next frame of display data using the received first portion and the estimated second portion.

Preferably, the sensor data comprises one or more of:
  data from an accelerometer;
  data from a gyroscope;
  data relating to triangulation between multiple wireless antennae;
  data from a video feed of a camera.

In an embodiment, generating an estimated next frame of display data using the stored current frame and the sensor data comprises applying a shift in position of the display data of the stored current frame based on a movement of the movable display indicated by the sensor data. The applied shift may be constant over the display data of the whole current frame or the applied shift may be variable over different portions of the display data of the current frame.

Generating an estimated next frame of display data using the stored current frame and the sensor data preferably comprises receiving information from the host device indicating how the estimated frame is to be generated from the stored current frame based on the sensor data. The information indicating how the estimated frame is to be generated from the stored current frame based on the sensor data preferably includes a map of the stored current frame showing different portions of the display data to which different variables are to be applied. Alternatively, the information indicating how the estimated frame is to be generated from the stored current frame based on the sensor data includes information for the display control device to generate a map of the stored current frame showing different portions of the display data to which different variables are to be applied. The different variables may include one or more of: shifts in location of the display data, resolution of the display data, colour depth of the display data.

In some embodiments, a frame refresh rate for the next frame at the display control device may be higher than a frequency of frame generation at the host device.

According to a second aspect, the invention provides a display control device configured to perform all steps of a method as described above.

According to a third aspect, the invention provides an apparatus comprising a display control device as described above, and the movable display. The apparatus may comprise a Virtual Reality, VR, or Augmented Reality, AR, headset.

According to a fourth aspect, the invention provides a system comprising an apparatus as described above, and a host device.

In a further aspect, the invention provides a method of using sensor data to estimate replacement frames of display data for display, comprising:
  1. A host device generates a frame of display data (F1)
  2. The host device transmits F1 to the display control device
  3. The display control device receives sensor data and transmits it to the host device
  4. The display control device fails to receive an expected second frame of display data (F2)
  5. The display control device uses the sensor data to amend F1 to produce an estimated frame (F2')
  6. The display control device displays F2' on a connected display panel This method means that if a frame or part of a frame of display data is lost in transmission between the host device and the display control device, an approximation of the lost frame or part of a frame can be generated using information on movement of the display control device and a previous frame and the previous frame can therefore appear to change based on that movement.

Preferably, the display control device and connected display panel are a head-mounted display device such as a virtual-reality or augmented-reality headset.

The sensor data may comprise output from an accelerometer, gyroscope, or location detector based on GPS, triangulation between multiple wireless antennae, or a video feed from a camera.

In one embodiment, amendment of F 1 comprises applying a constant shift across the whole frame according to the movement indicated by the sensor data. In a similar embodiment, the display control device may apply a greater shift in one part of the frame, such as the centre, compared to other parts of the frame.

Parts of the frame may be amended to greater or lesser degrees according to input from the host device. For example, the host device may transmit a map showing how shifts should be applied to different parts of the frame according to, for example, the depths of objects within a virtual world.

Alternatively, the host device may transmit information that would allow such a map to be calculated.

BRIEF DESCRIPTION OF THE DRAWINGS

Embodiments of the invention will now be more fully described, by way of example, with reference to the drawings, of which:

FIGS. 7a and 7b show an estimated frame of display data produced using an embodiment of the invention.

DETAILED DESCRIPTION OF THE DRAWINGS

Figure 1B:
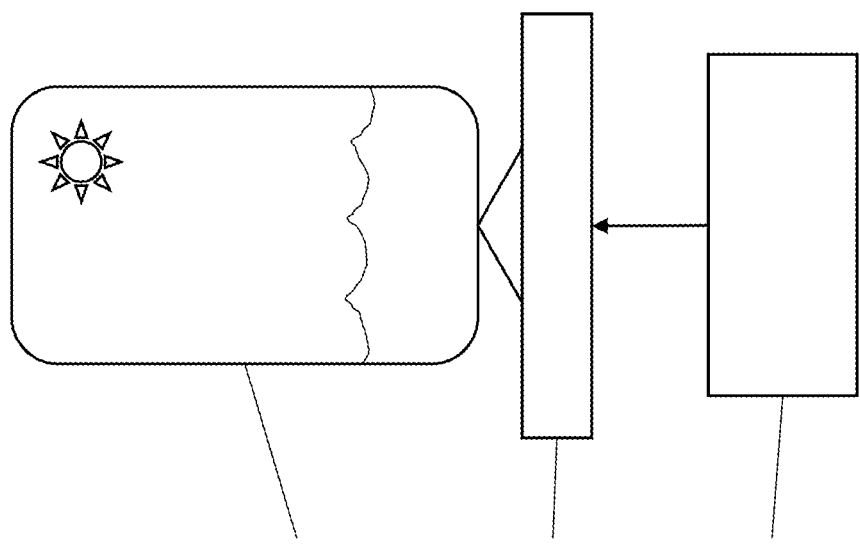
FIGS. 1a and 1b show example systems in which embodiments of the invention could be used.
Figure 1A:
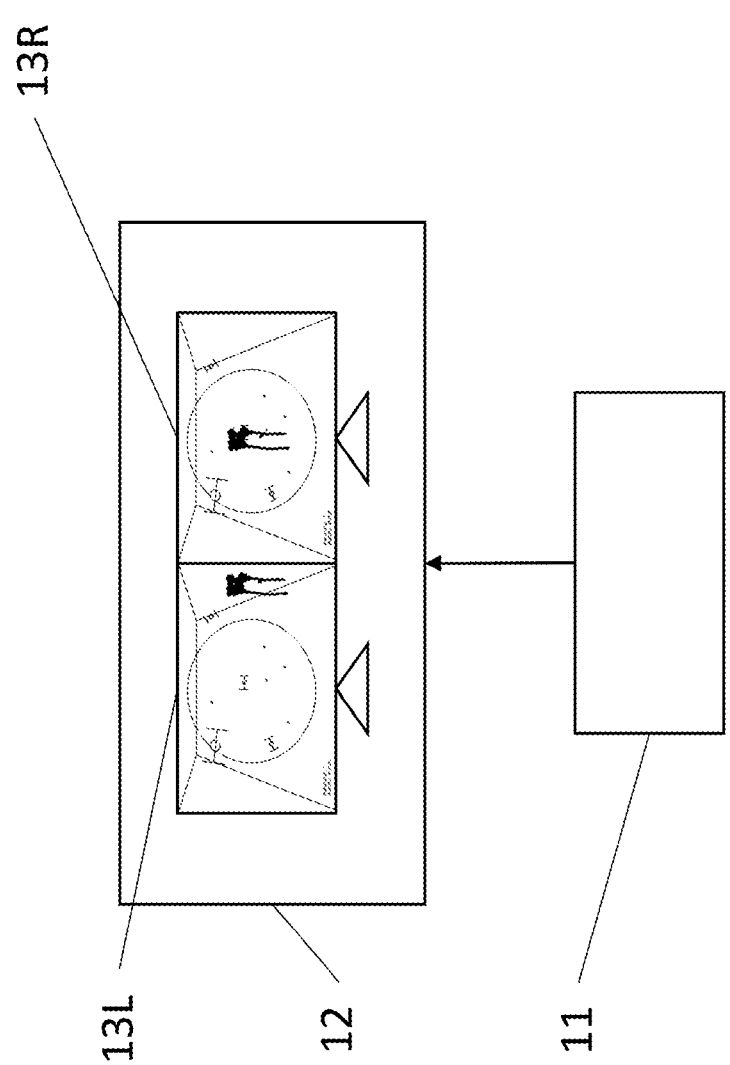

FIGS. 1a and 1b show two example systems in which embodiments of the invention could be used. FIG. 1a shows a system such as a virtual-reality headset which displays two frames of display data on two integral display panels [13L, 13R], one in front of each of the user's eyes. The frames show the same image with some changes between them to give an appearance of parallax and therefore depth. FIG. 1b shows a system in which an image is shown on a single large display [13] such as a fake window in a vehicle which shows an outdoor scene.

In both cases, the display devices [13] are attached to host computing devices [11] and show images that will change depending on the movement of the display device [13] and/or connected display control device [12]. In the case of the virtual-reality headset [12] shown in FIG. 1a, this movement will occur when the display control device [12] comprising the headset is moved as a user wearing the headset moves. In the case of the fake window [13] shown in FIG. 1b, this movement might occur as a vehicle in which the window is installed moves. The display devices [13] are therefore referred to as mobile display devices.

When a mobile display device such as those shown in FIGS. 1a and 1b moves, the display data displayed on it needs to change to show a new view in order to give the impression that the viewer is looking at a different part of a virtual world. This means that the frame displayed by the display device needs to be updated. When the frame is transmitted from a remote host, part or all of the frame may not be available when required for display. This has meant that the system has had to use the display data for the previous frame.

Figure 2B:
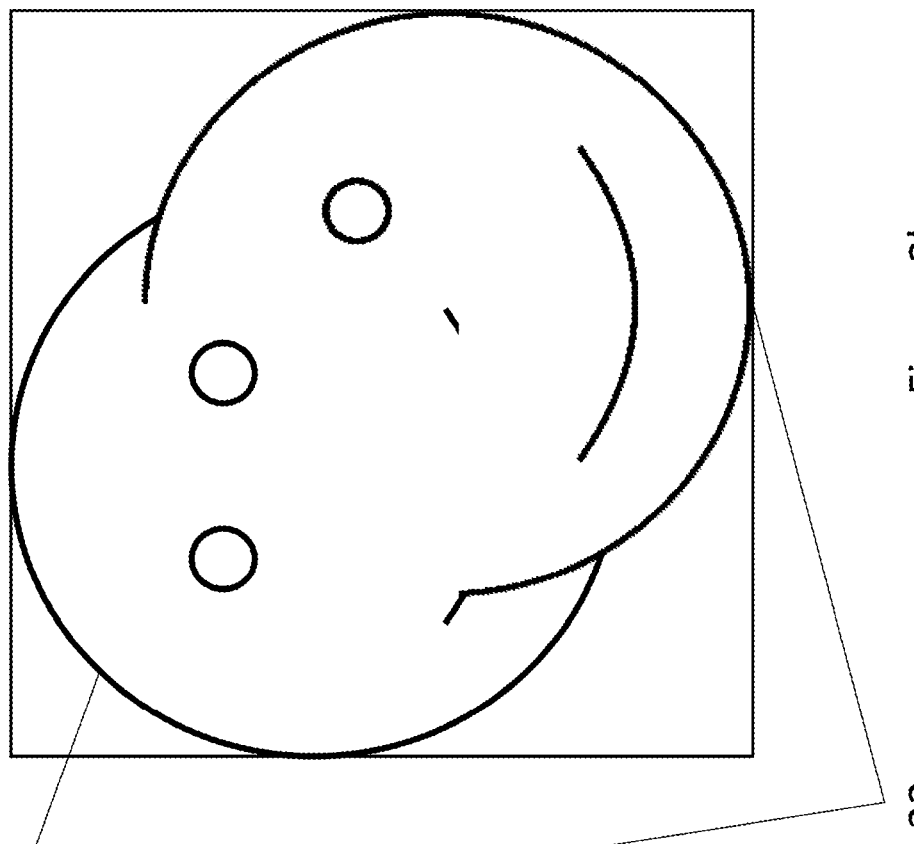
FIGS. 2a and 2b show a frame of display data according to the current art, demonstrating tearing.
Figure 2A:
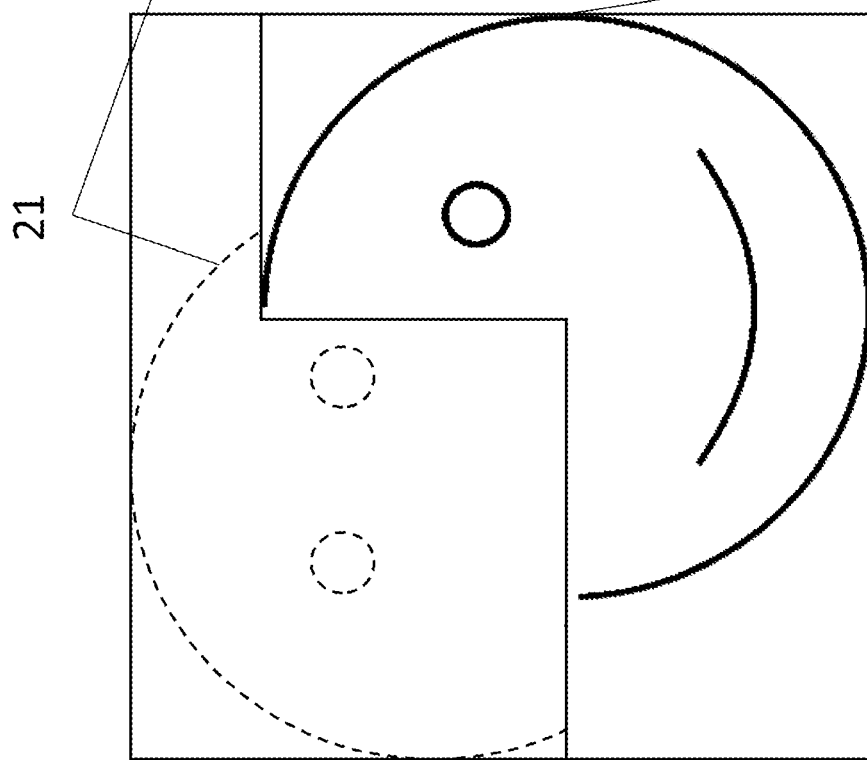

An example of this is shown in FIG. 2. On the left, in FIG. 2a, the movement of an object between two frames is shown moving from a lower right position to an upper left position, with the later data [21] being shown dashed in FIG. 2a while the earlier data [22] is shown in black.

As the display data is rendered, it is displayed in rasterised form on the display panel in stripes from left to right and top to bottom in the conventional way. However, if the new frame [21] is not available, the rendering process must continue, so the display data from the previous frame [22] is displayed in the same location as it previously occupied. Where the movement is considerable, as here, there is a significant discrepancy between the locations of the same object in the two frames, resulting in doubling, as shown in FIG. 2b.

Figure 3:
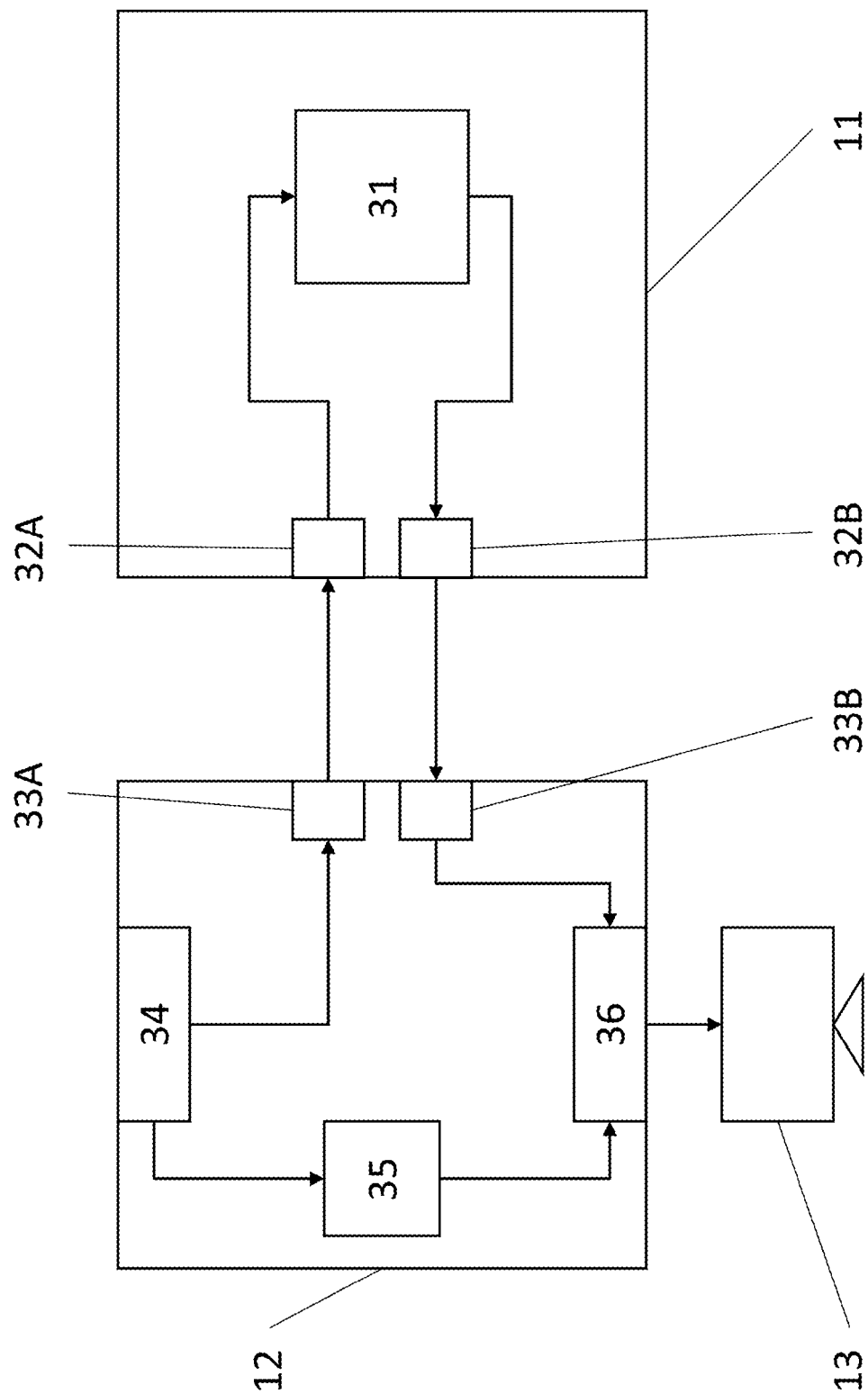
FIG. 3 shows a block diagram of a system according to one embodiment of the invention.

FIG. 3 shows an example system according to an embodiment of the invention. A host device [11] is connected to a display control device [12], which is in turn connected to a display panel [13]. As previously mentioned, the display control device [12] and display panel [13] may be co-located, i.e. they may be part of the same device such as a virtual-reality headset. The display control device [12] and the host device [11] may be connected via a wired or wireless connection.

The host device [11] includes, among other components, a processor [31] which receives sensor data from the display control device [12] and uses it, together with instructions, to generate display data. The processor [31] is connected to a host-side input engine [32A] and a host-side output engine [32B]. The host-side input engine [32A] receives sensor data transmitted by the display control device [12] and the host-side output engine [32B] transmits display data to the display control device [12]. They are connected to corresponding components on the display control device [12]: the host-side output engine [32B] is connected to a device-side input engine [33B] which receives display data from the host device [11], and the host-side input engine [32A] is connected to a device-side output engine [33A] which transmits sensor data received from the sensors [34] on the display control device [12].

The sensors [34] are also connected to a correction engine [35], and both the correction engine [35] and the device-side input engine [33B] are connected to a display output engine [36], which receives frames of display data from one or both of the device-side input engine [33B] and the correction engine [35]. It then transmits the display data to the connected display panel [13] for display.

Figure 4:
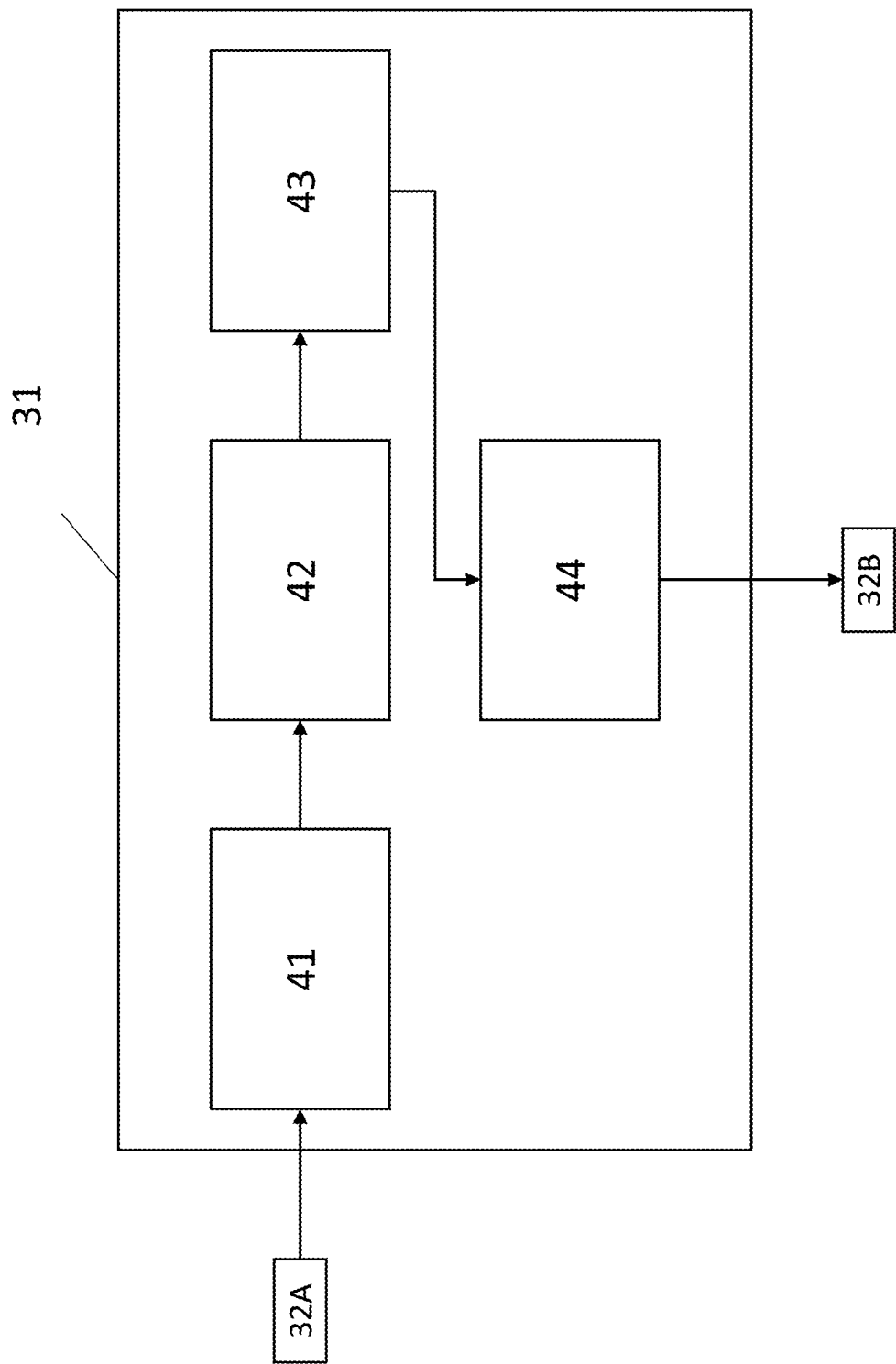
FIG. 4 shows a more detailed block diagram of the processor of FIG. 3.

FIG. 4 shows a more detailed block diagram of the processor [31], showing the use of sensor data in generation of a frame of display data for transmission to the display control device [12]. The sensor data from the display control device [12] is received from the host-side input engine [32A] by a movement data generation engine [41], which converts raw sensor data into the appropriate form for the application [43] which will generate the display data.

Because a delay is introduced by the transmission of the sensor data from the display control device [12], the generated movement data is then passed to a prediction engine [42], which extrapolates the movement data to predict a continuation of the movement data, such that if the movement data indicated that the display control device [42] was moving to the right the prediction engine [42] assumes that it will continue to move to the right, and so forth.

The predicted movement data is then passed to the application [43] and used to generate a frame of display data that will be appropriate for display at the time it arrives at the display control device [12]. Where the display control device [12] is a head-mounted display device such as a virtual-reality headset, the frame [44] may be in the form of two images, one of which will be displayed to each of the user's eyes as described in FIG. 1a, but such images are commonly transmitted as a single frame [44].

The frame [44] is then passed to the host-side output engine [32B] for transmission to the display control device [12] for display.

Figure 5:
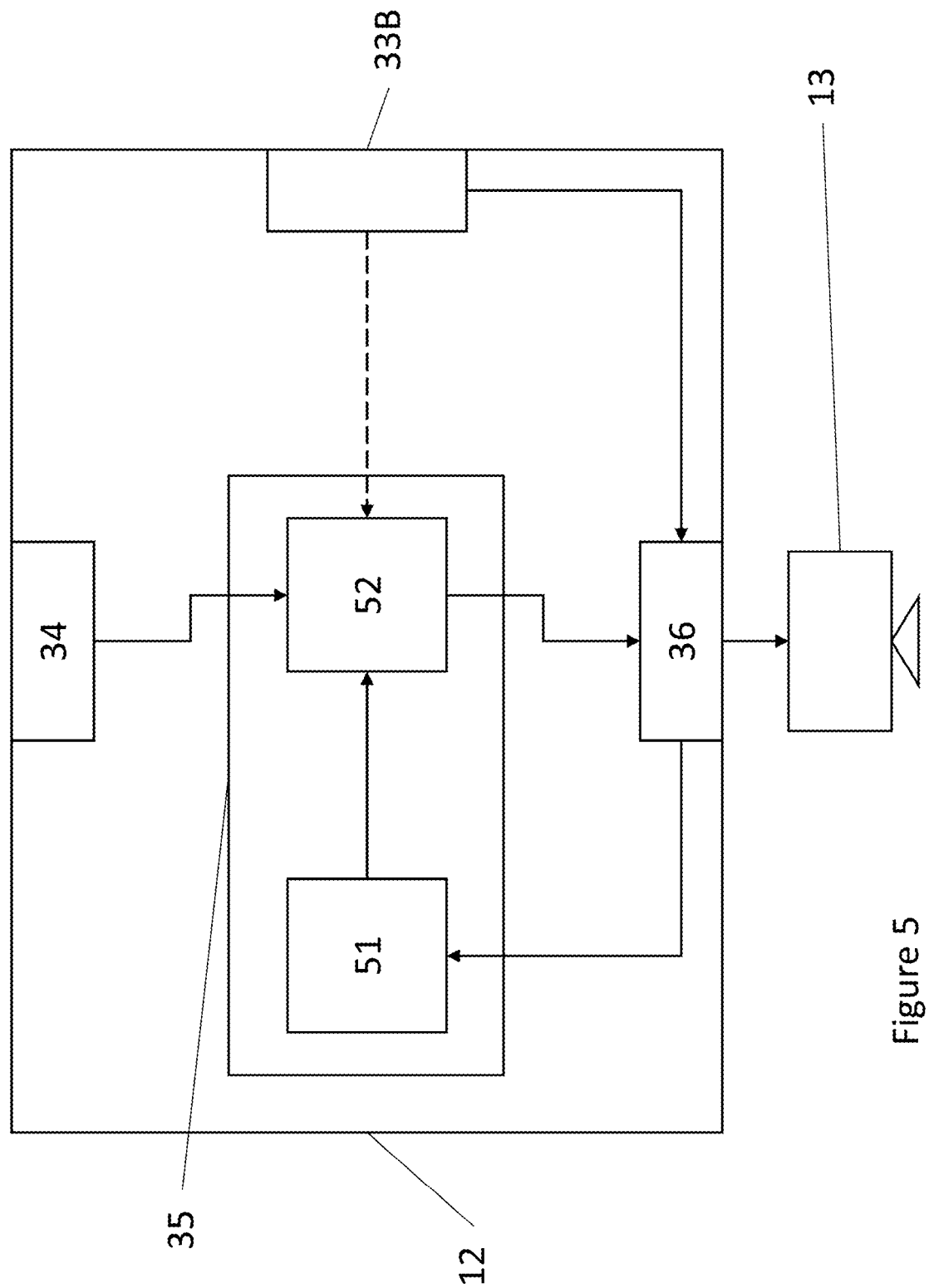
FIG. 5 shows a more detailed block diagram of the display control device of FIG. 3.

FIG. 5 shows a more detailed block diagram of the parts of the display control device [12] connected to the correction engine [35], together with some internal components of the correction engine [35]. The display control device [12] includes sensors [34] which detect movement of the display control device [12]. There may also be other sensors which detect sound, temperature, light level, etc., but they are not relevant to the methods of the invention. The sensors [34] are connected to a compositor [52] in the correction engine [35].

The device-side input engine [33B] is also shown. This receives display data from the host device [11] as previously mentioned, and accordingly is connected to the display output engine [36]. It is also connected to the compositor [52] for the purpose of sending signals to the compositor [52] to indicate whether or not it has received a complete frame of display data.

The compositor [52] is also connected to a frame buffer [51] inside the correction engine [35], which stores the last frame output by the display output engine [12]. Accordingly, the frame buffer [51] is also connected to the display output engine [36]. The display output engine [36] is also connected to the compositor [52] so that it can receive amended frame data from the compositor [52], as well as being connected to the device-side input engine [33B] and the display panel [13] as previously described.

Figure 6:
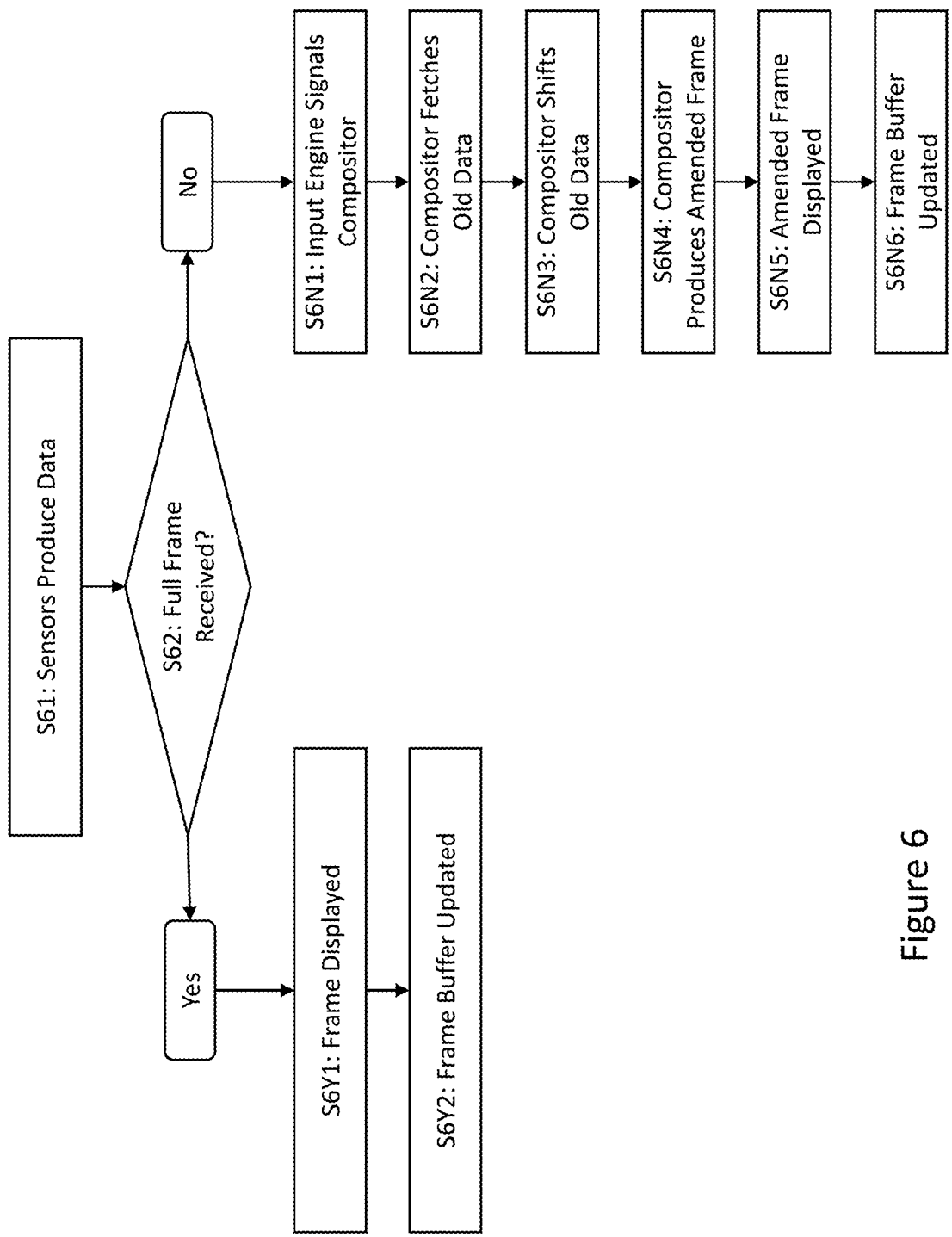
FIG. 6 shows a flow diagram illustrating a process of an embodiment of the invention.

FIG. 6 shows an example process for an embodiment of the invention in which all the processing is carried out on the display control device [12]. This version of the method is reliable and has very low latency as all the processing is carried out locally, but it cannot be very intelligent due to the limited processing power available on the display control device [12].

At Step S61, the sensors [34] detect movement of the display control device [12], according to the sensors [34] that are installed. For example, a gyroscope may detect rotation while an accelerometer may detect linear movement, or a camera facing the outside of the display control device [12] may detect a movement of a particular point of reference. This information is transmitted to the host device [11] for use in generating display data reflecting the movement of the display control device [12], as previously described, and may also be used by the compositor [52] in applying a shift to a previous frame of display data.

At Step 62, the device-side input engine [33B] determines whether it has received a complete frame of display data from the host device [11]. This may mean detecting whether any display data has been received and therefore whether the entire frame is lost, or may mean counting the number of packets of display data received and comparing it to an expected number.

If a complete frame has been received, the process follows the branch beginning at "Yes": the device-side input engine [33B] passes the received frame to the display output engine [36], which displays it in the conventional way at Step S6Y1. The display output engine [36] then also stores the displayed frame in the frame buffer [51] in the correction engine [35] for future use at Step S6Y2.

If a complete frame is not received, the process follows the branch beginning at "No" and the device-side input engine [33B] sends a signal to the compositor [52] in the correction engine [35] indicating that it needs to produce an amended frame. In some embodiments, the device-side input engine [33B] may also send the compositor [52] any display data received so this can be incorporated into the amended frame.

At Step S6N1, the compositor [52] fetches the stored previous frame from the frame buffer [51]. If there have been no previous frames—for example, the first frame sent upon connection is lost or partially lost—the frame buffer [51] may contain a default frame such as a frame of a single colour or a splash screen, though naturally neither of these will produce a good result.

At Step S6N3, the compositor [52] applies a shift to the previous frame, copying the data from its original location in the frame to a second location in accordance with the data received from the sensors [34] indicating the movement of the display control device [12]. For example, if the sensors [34] report a linear movement to the left, the compositor [52] may shift the entire frame to the right. Because the sensor data is taken directly from the sensors [34], it is immediately up to date with no prediction required, unlike the movement data used in the original generation of the display data as described with reference to FIG. 4.

In the example where the device-side input engine [33B] passed a partial received frame to the compositor [52], the compositor [52] may blend the partial frame with the shifted previous frame such that where new data is available it replaces the amended data. Where no data is available for part of the final amended frame, for example because the area required was beyond the edges of the previous frame, the compositor [52] may fill this area with a flat colour, for example derived from an average colour of an area of the amended frame.

As part of the blending process, the compositor [52] may also blur the edges of the shifted tiles in order to reduce the obviousness of any tearing. The compositor [52] may also or instead apply warping to the frame, based on optical elements between the display panel [13] and the viewer's eyes. This is important because mobile display devices such as virtual-reality headsets commonly include lenses between the user's eyes and the integral display panels to make it easier for the user to focus. These lenses can introduce aberrations in the appearance of the display data, and this method can also be used to correct for such aberrations. Accordingly, the sensor data may also include information from such optical elements.

At Step S6N4 the compositor [52] outputs the amended frame to the display output engine [36]. If partial data was not passed to the compositor [52] at Step S6N1 and blended with the shifted previous frame data at Step S6N3, such an operation may be carried out by the display output engine [36] prior to the amended frame being transmitted to the display panel [13] for display.

At Step S6N6, the amended frame is stored in the frame buffer [51], as previously mentioned, in case the next frame is also lost.

The compositor [52] may apply a uniform shift across the whole of a previous frame, as suggested here, or it may apply different magnitudes of shift to different areas of the frame, for example by applying a greater shift to the middle of the frame than the edges. Alternatively, especially in the case of a headset where a slightly different image is being displayed to each of a user's two eyes, the compositor [52] may apply a different shift to each half of a frame or to each of two frames, according to stored parallax data.

Methods such as this can also be used to interpolate frames between those transmitted by the host device [11] in cases where the frame refresh of the display panel [13] is faster than the speed at which the host device [11] produces frames. It also allows other fine changes and corrections to be carried out in the display control device [12]. This is a particularly beneficial use for low-latency sensor data within a headset, since the latency of transmission would make it impossible to perform such fine changes on the host device [11].

For example, a headset has inertia and will not immediately be still after a fast movement. A pressure sensor against part of the user's head such as the bridge of his or her nose could be used to detect independent movement and a method such as that described in FIG. 6 could be used to correct for it at very low latency and without sending large volumes of unnecessary data back to the host device [11].

FIG. 7 shows an amended frame produced by one of the methods of the invention. It is arranged similarly to the example frame shown in FIG. 2: on the left, in FIG. 7a, the earlier data [72] is once again shown in full for clarity while the later data [71] is shown with dashed lines. Compared to its original location as shown in FIG. 2a it has been shifted upwards and to the left. This produces the frame shown in FIG. 7b, in which while there is still a small amount of tearing which could be disguised by blurring the edges of the two areas [71, 72], the effect is much less obvious. This will result in a significantly better user experience.

Figure 8:
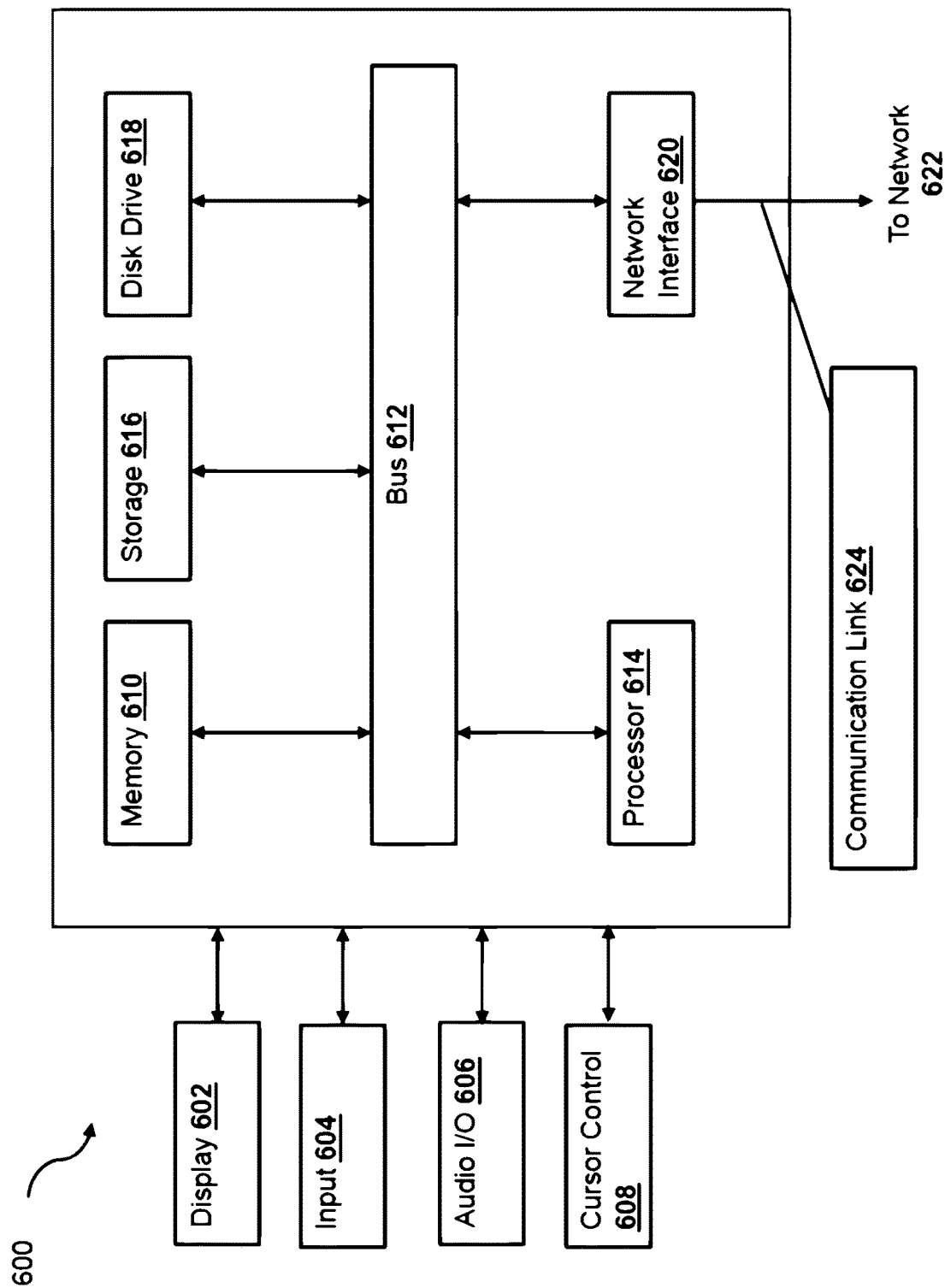
FIG. 8 is a block diagram of a computer system suitable for implementing one or more of the embodiments.

FIG. 8 is a block diagram of a computer system [600] suitable for implementing one or more embodiments of the present disclosure, including the host device [11] and the headset including the display control device [12]. The computer system [600] includes a bus [612] or other communication mechanism for communicating information data, signals, and information between various components of the computer system [600]. The components include an input/output (I/O) component [604] that processes a user (i.e., sender, recipient, service provider) action, such as selecting keys from a keypad/keyboard, selecting one or more buttons or links, etc., and sends a corresponding signal to the bus [612]. The I/O component [604] may also include an output component, such as a display [602] and a cursor control [608] (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the display data generation functionalities described herein according to the process described above.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

Although particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa, and modules which are described as separate may be combined into single modules and vice versa. Functionality of the modules may be embodied in one or more hardware processing device(s) e.g. processors and/or in one or more software modules, or in any appropriate combination of hardware devices and software modules. Furthermore, software instructions to implement the described methods may be provided on a computer readable medium.

The invention claimed is:

1. A method of generating display data at a display control device for display on a movable display, the method comprising:
receiving and storing a current frame of display data from a host device;
processing the current frame of display data;
outputting the current frame of display data for display on the movable display;
receiving and storing sensor data from sensors associated with the movable display indicating a movement or a position of the movable display;
determining that a next frame of display data is not ready at the display control device for processing and outputting to the movable display at a required time;
generating an estimated next frame of display data using the stored current frame and the stored sensor data, wherein the estimated next frame comprises an amended frame generated by blending a portion of the stored current frame and additional display data received from the host device; and
outputting the estimated next frame of display data for display on the movable display; wherein receiving the sensor data occurs before or after the receiving and storing the current frame, the processing the current frame or the outputting the current frame.

2. The method according to claim 1, wherein determining that a next frame of display data is not ready at the display control device comprises determining that at least a portion of the next frame of display data has not been received and stored in time for processing and outputting to the movable display.

3. The method according to claim 2, wherein upon determining that a first portion of the next frame of display data has been received in time, but that a second portion of the next frame of display data has not been received in time, generating an estimated second portion of the next frame of display data using the stored current frame and the sensor data, and generating the next frame of display data using the received first portion and the estimated second portion.

4. The method according to claim 1, wherein the sensor data comprises one or more of:
data from an accelerometer;
data from a gyroscope;
data relating to triangulation between multiple wireless antennae;
data from a video feed of a camera; or
data from one or more optical elements arranged between the movable display and a viewer thereof.

5. The method according to claim 1, wherein generating an estimated next frame of display data using the stored current frame and the sensor data comprises applying a shift in position of the display data of the stored current frame based on a movement of the movable display indicated by the sensor data.

6. The method according to claim 5, wherein the applied shift is constant over all portions of the display data of the current frame.

7. The method according to claim 5, wherein the applied shift is variable over different portions of the display data of the current frame.

8. The method according to claim 5, wherein generating an estimated next frame of display data using the stored current frame and the sensor data comprises also applying warping to the display data of the stored current frame based on optical characteristics of one or more optical elements arranged between the movable display and a viewer thereof.

9. The method according to claim 1, wherein generating an estimated next frame of display data using the stored current frame and the sensor data comprises receiving information from the host device indicating how the estimated frame is to be generated from the stored current frame based on the sensor data.

10. The method according to claim 9, wherein the different variables include one or more of shifts in location of the display data, resolution of the display data, or colour depth of the display data.

11. The method according to claim 1, wherein a frame refresh rate for the next frame at the display control device is higher than a frequency of frame generation at the host device.

12. A display control device comprising:
a non-transitory memory storing instructions; and
one or more hardware processors coupled to the non-transitory memory and configured to execute the instructions from the non-transitory memory to cause the display control device to perform operations comprising:
receiving and storing a current frame of display data from a host device;
processing the current frame of display data;
outputting the current frame of display data for display on a movable display;
receiving and storing sensor data from sensors associated with the movable display indicating a movement or a position of the movable display;

determining that a next frame of display data is not ready at the display control device for processing and outputting to the movable display at a required time;

generating an estimated next frame of display data using the stored current frame and the stored sensor data, wherein the estimated next frame comprises an amended frame generated by blending a portion of the stored current frame and additional display data received from the host device; and outputting the estimated next frame of display data for display on the movable display; wherein receiving the sensor data occurs before or after the receiving and storing the current frame, the processing the current frame or the outputting the current frame.

13. An apparatus comprising the display control device according to claim 12, and the movable display.

14. The apparatus according to claim 13, wherein the sensors comprise one or more of:
an accelerometer;
a gyroscope;
multiple wireless antennae;
a video camera; or
one or more optical elements arranged between the movable display and a viewer thereof.

15. The apparatus according to claim 13, further comprising a Virtual Reality (VR) or an Augmented Reality (AR) headset.

16. A system comprising the apparatus according to claim 13, and a host device.

17. A system comprising:
a non-transitory memory storing instructions or local data; and
one or more hardware processors coupled to the non-transitory memory and configured to execute the instructions from the non-transitory memory to cause the system to perform operations comprising:
receiving and storing a current frame of display data from a host device;
processing the current frame of display data;
outputting the current frame of display data for display on a movable display;
receiving and storing sensor data from sensors associated with the movable display indicating a movement or a position of the movable display;
determining that a next frame of display data is not ready at the display control device for processing and outputting to the movable display at a required time;
generating an estimated next frame of display data using the stored current frame and the stored sensor data, wherein the estimated next frame comprises an amended frame generated by blending a portion of the stored current frame and additional display data received from the host device; and
outputting the estimated next frame of display data for display on the movable display; wherein receiving the sensor data occurs before or after the receiving and storing the current frame, the processing the current frame or the outputting the current frame.

18. The method according to claim 1, further comprising:
after the receiving and storing the sensor data, transmitting information relating to the sensor data to the host device.

19. The display control device according to claim 12, wherein the operations further comprising:
after the receiving and storing the sensor data, transmitting information relating to the sensor data to the host device.

20. The system according to claim 17, wherein the operations further comprising:
after the receiving and storing the sensor data, transmitting information relating to the sensor data to the host device.

* * * * *